United States Patent [19]

Neff

[11] 3,794,769

[45] Feb. 26, 1974

[54] AZIMUTH ADJUSTMENT PARTICULARLY FOR MAGNETIC HEADS

[75] Inventor: Joseph J. Neff, Pasadena, Calif.

[73] Assignee: Bell & Howell Company, Chicago, Ill.

[22] Filed: Jan. 19, 1972

[21] Appl. No.: 218,978

[52] U.S. Cl. .............................. 360/109, 274/4 A

[51] Int. Cl. ............................................ G11b 5/56

[58] Field of Search ........... 179/100.2 CA; 274/4 A; 74/63, 53, 54, 55, 56, 57, 58, 59, 567, 569

[56] References Cited

UNITED STATES PATENTS

| | | | |
|---|---|---|---|
| 2,678,971 | 5/1954 | Barany | 179/100.2 CA |
| 3,455,559 | 7/1969 | Wilson | 179/100.2 CA |
| 2,294,437 | 9/1942 | Allen et al. | 74/56 |
| 2,897,288 | 7/1959 | Wijchman | 179/100.2 CA |
| 3,679,841 | 7/1972 | Herger | 179/100.2 CA |
| 3,539,191 | 11/1970 | Yamamoto | 274/4 A |
| 1,676,114 | 7/1928 | Rusdell | 74/56 |

*Primary Examiner*—Terrell W. Fears
*Assistant Examiner*—Jay P. Lucas
*Attorney, Agent, or Firm*—Benoit Law Corporation

[57] ABSTRACT

An azimuth adjustment for magnetic recording heads and other devices has a rotatable member with an inclined surface relative to an axis of rotation. A mount for the recording heads or other devices has a pair of spaced cam followers which are yieldably pressed against the inclined surface of the rotatable member. To effect azimuth adjustments, the rotatable member is rotated whereby the mount is selectively twisted.

20 Claims, 5 Drawing Figures

AZIMUTH ADJUSTMENT PARTICULARLY FOR MAGNETIC HEADS

BACKGROUND OF THE INVENTION

1. Field of the Invention

The subject invention relates to methods and apparatus for adjusting the azimuth of a device. By way of example, the device may be a magnetic recording head device the azimuth of which is to be selectively adjusted.

2. Description of the Prior Art

The expression "azimuth adjustment" is herein used in a general sense referring, for instance, to the angular adjustment of a device relative to a reference axis or plane. Apparatus and methods for effecting such adjustments have utility in magnetic tape recorders, optical sound recorders, leveling devices and optical or other measuring instruments which require adjustment of the angular position of a part relative to a reference axis or plane.

By way of example, and not by way of limitation, numerous techniques and devices have been proposed for adjusting the azimuth of magnetic tape recording heads relative to an axis extending perpendicularly to the direction of magnetic tape advance. Existing azimuth adjustments are either burdened by considerable complexity or limited applicability, or have the drawback of undesirably shifting the location of the device during angular adjustments.

SUMMARY OF THE INVENTION

The subject invention overcomes the above mentioned disadvantages and provides azimuth adjustment methods and apparatus that are relatively simple and inexpensive and that enable azimuth adjustments without undesirable side effects.

From one aspect thereof, the subject invention resides in a method of mounting a device and adjusting the azimuth of said device in a first plane. This method comprises, in combination, the steps of providing a rotatable member having an inclined surface relative to an axis extending substantially parallel to the above mentioned first plane, mounting the rotatable member for rotation relative to the named axis, providing a mount for the device having a resilient portion, establishing a force-transmitting relationship between the inclined surface and the mount at a first location, and establishing a force-transmitting relationship between the inclined surface and the mount at a second location, with these first and second locations being situated at opposite sides of the named axis and extend in a second plane which, in turn, extends at an angle to a third plane extending perpendicular to the first plane, mounting the device on the above mentioned mount at the first plane, and twisting said mount at said resilient portion by rotating the rotatable member relative to the named axis to adjust the azimuth of the device.

In accordance with the most preferred embodiment of the subject invention, the above mentioned second plane is made to extend parallel to the first plane.

In accordance with a further preferred embodiment of the subject invention, a support is provided for the above mentioned mount, and the mount is mounted on this support at a third location situated behind the above mentioned first plane as seen from the named axis.

In accordance with a further preferred embodiment of the subject invention, the mount is provided with said resilient portion between the first plane and the third location, permitting twisting of the mount during azimuth adjustments.

From another aspect thereof, the subject invention resides in apparatus for mounting a device and adjusting the azimuth of this device in a first plane. According to the invention, this apparatus comprises, in combination, supporting means, a rotatable member having an inclined surface relative to an axis extending substantially parallel to the first plane, a mount for the device, means for mounting the rotatable member for rotation relative to the named axis, means at the mount and at the rotatable member for establishing a force-transmitting relationship between the inclined surface and the mount at two spaced locations having the named axis situated therebetween and extending in a second plane which, in turn, extends at an angle to a third plane extending perpendicular to the first plane, means for connecting the mount to the support means at a third location situated behind the first plane as seen from the named axis, means for mounting the device on the mount at the first plane said mount having a resilient portion between said first plane and said third location, and means for rotating the rotatable member relative to the axis to adjust the aximuth of the device.

In accordance with the most preferred embodiment of the subject invention, the above mentioned second plane extends parallel to the named first plane.

In accordance with a further preferred embodiment of the subject invention, the mount has a resilient portion between the first plane and the third location.

In accordance with a reduced cross-section at said further preferred embodiment of the subject invention, the means for establishing the force-transmitting relationship include a pair of spaced cam followers projecting from the mount onto the inclined surface of the rotatable member. These cam followers have the named axis situated therebetween and extend in the above mentioned second plane. The cam followers may be integral with the mount.

In accordance with a further preferred embodiment of the subject invention, the means for establishing the above mentioned force-transmitting relationship further include resilient means for yieldably pressing the cam followers into contact with the inclined surface of the rotatable member.

From another aspect thereof, the invention resides in apparatus for mounting an information transducing device and adjusting the azimuth of the transducing device relative to an information recording medium, a base comprising in combination, a mount for the transducing device having a resilient portion, means for connecting said mount to said base to one side of said resilient portion, means for mounting the transducing device on that mount to another side of said resilient portion, means coupled to the mount for selectively and torsionally twisting the said resilient portion of mount relative to a torsion axis whereby to adjust the azimuth of the transducing device, and means coupled to the mount for retaining the mount against translatory motion relative to said torsion axis.

BRIEF DESCRIPTION OF THE DRAWINGS

The subject invention and its objects will become more readily apparent from the following detailed description of preferred embodiments thereof, illustrated by way of example in the accompanying drawings, in which.

DESCRIPTION OF PREFERRED EMBODIMENTS

Figures 1, 2, 3, 4, 5:
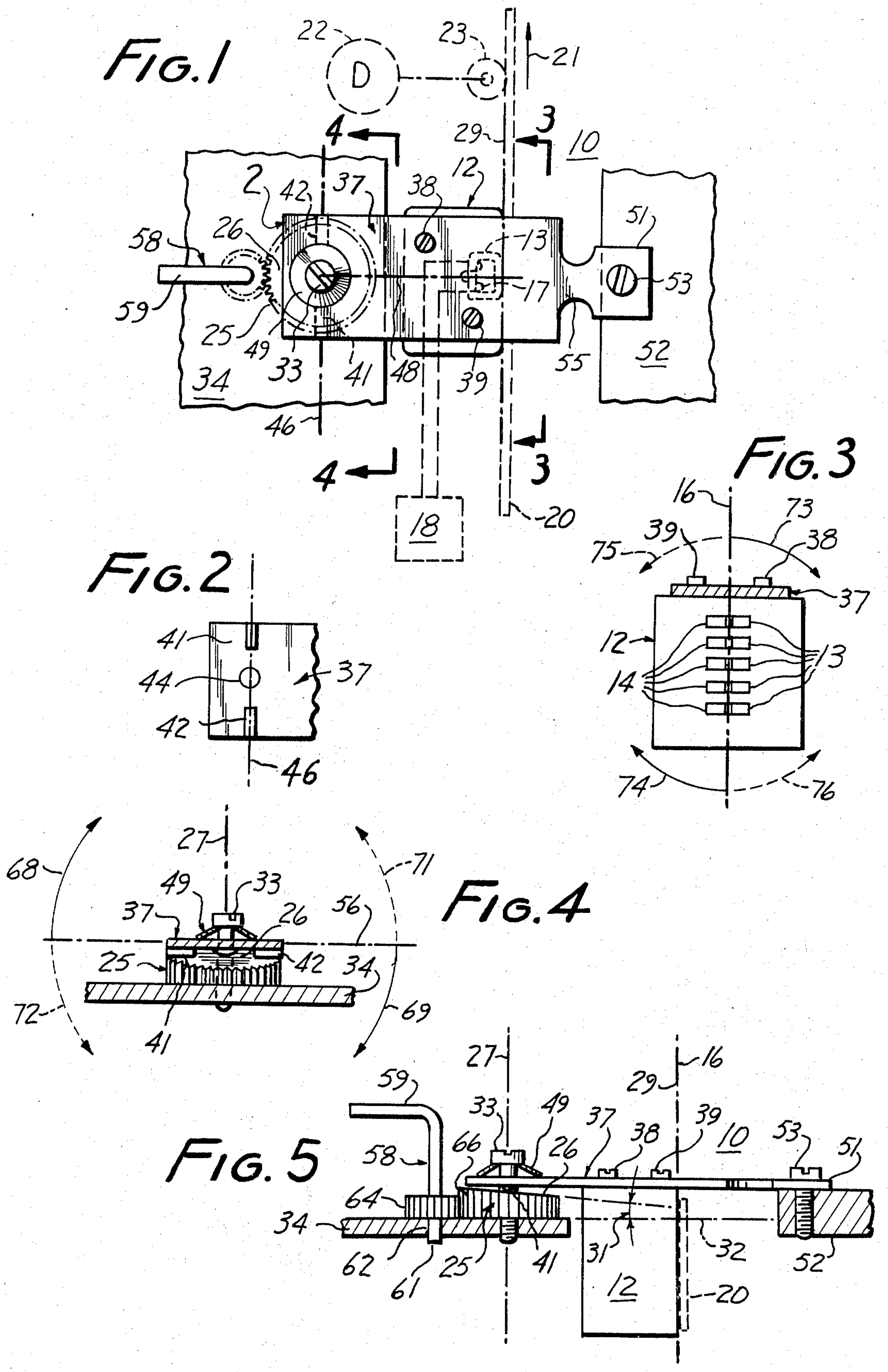
FIG. 1 is a plan view of a mounting and azimuth adjusting apparatus in accordance with a preferred embodiment of the subject invention.
FIG. 2 is a detail view of the underside of a part of the apparatus of FIG. 1.
FIG. 3 is a view taken on the line 3 — 3 of FIG. 1.
FIG. 4 is a view taken on the line 4 — 4 of FIG. 1.
FIG. 5 is a side view, partially in section, of the apparatus of FIG. 1.

By way of example, the apparatus and method shown in the drawings serves to mount and adjust the azimuth of a magnetic recording device 12. As is best apparent in FIG. 3, the recording device 12 in a conventional manner includes a bank of magnetic recording heads 13 which have air or recording gaps 14 aligned on an axis 16.

Magnetic recording devices of this type are conventional in magnetic instrumentation tape recording or in other magnetic multi-channel recording fields. As diagrammatically indicated in FIG. 1, each recording head 13 has a winding 17 connected to a source 18 of electrical signals that are to be recorded on a magnetic recording tape 20. In accordance with conventional practice, the magnetic recording tape 20, shown in dotted outline in FIGS. 1 and 5, is advanced past the recording heads 13 in the direction of an arrow 21 by a tape drive 22 having a tape drive capstan 23.

As is also well known in the art of magnetic tape recording, serious signal degradations occur when the azimuth of the airgaps 14 of the magnetic heads upon playback do not correspond to the azimuth of the airgaps 14 of the magnetic heads 13 employed during recording.

In accordance with the subject invention, the mounting and azimuth adjusting apparatus 10 shown in the drawings has or is provided with a rotatable member 25 having an inclined surface 26 relative to an axis 27 seen in FIGS. 4 and 5. The axis 27 extends substantially parallel to a plane 29. As seen in FIGS. 1 and 5, the plane 29 is the plane at which the airgaps 14 of the recording heads 13 are located for recording purposes. As seen in FIG. 5, the above mentioned axis 16, along which the headgaps 14 are aligned as shown in FIG. 3, is located in the plane 29.

The inclination of the surface 26 of the rotatable member 25 may also be viewed in terms of an angle 31 between the inclined surface 26 and a plane 32 that extends at right angles to the axis 27 and plane 29.

The rotatable member 25 is mounted by a screw 33 on a conventional baseplate or support 34 for rotation relative to or about the axis 27.

The apparatus 10 further includes a mount 37 for the recording device 12. In the illustrated preferred embodiment, the mount 37 is in the form of a substantially rectangular, flat plate. The recording device 12 is mounted on the mount 37 by means of screws 38 and 39.

A pair of cam followers 41 and 42 establish a force-transmitting relationship between the inclined surface 26 of the rotatable member 25 and the mount 37 at a first location occupied by the cam follower 41, and a force-transmitting relationship between the inclined surface 26 and the mount 37 at a second location occupied by the cam follower 42. In accordance with the illustrated preferred embodiment, the cam followers 41 and 42 are integral with and project from the mount 37 onto the inclined surface 26 of the rotatable member 25.

As best seen in FIG. 4, the axis 27 is situated between the cam followers 41 and 42. As seen in FIG. 2, an aperture 44 for the screw 33 extends through the mount 37 between the cam followers 41 and 42 which protrude downwardly from the proper of the mount 37.

Moreover, the cam followers 41 and 42 extend in a plane 46 which extends at an angle of less than 90° relative to the plane 29.

According to the most preferred embodiment of the subject invention, the plane 46 is parallel to the plane 29. This position of the cam followers 41 and 42 is presently preferred since it yields an optimum precision of the azimuth adjustment without the imposition of undesired translatory motions on the recording device 12.

Azimuth adjustments are, however, also possible if the plane 46 in which the cam followers 41 and 42 are located extends at an angle to the plane 29, rather than being parallel thereto, provided the plane 46 does not intersect the plane 29 at right angles. This may be expressed by saying in a general manner that the plane 46 should extend at an angle to a plane 48 (see FIG. 1) which, in turn, is perpendicular to the plane 29.

The means for establishing the above mentioned force-transmitting relationship between the inclined surface 26 of the rotatable member 25 and the mount 37 further include a resilient device 49 for yieldably pressing the cam followers 41 and 42 into contact with the inclined surface 26. In the illustrated preferred embodiment, the resilient device 49 is a Belleville-type spring washer which is retained by the head of the screw 33 and which has peripheral portions pressing against the mount 37.

The end portion 51 of the mount 37 opposite the end portion carrying the cam followers 41 and 42 is connected to a conventional support or baseplate 52 by means of a screw 53 seen in FIGS. 1 and 5. The mount 37 has a resilient portion 55 between the plane 29 and the end portion 51. In the illustrated preferred embodiment, this resilient portion 55 is provided by reducing the cross-section of the mount 37. The resilient portion 55 enables the mount proper to carry out twisting motions relative to the horizontal reference plane 56 shown in FIG. 4. This, in turn, permits azimuth adjustments of the recording device 12 relative to the axis 16.

The apparatus 10 further includes a removable drive member or key 58 for rotating the rotatable member 25. The key 58 has a handle 59 with a pin 61 that is insertable into a corresponding aperture 62 in the support or baseplate 34, as seen in FIG. 5. The key 58 also includes a gear wheel or pinion 64. The rotatable member 25 is also in the form of a gear wheel since it has a toothed peripheral portion 66. The pinion 64 of the key 58 meshes with the toothed periphery 66 of the rotatable member 25 when the key pin 61 is inserted in the baseplate aperture 62.

Rotary motion of the key 58 accordingly imposes rotary motion upon the rotatable member 25. This, in turn, changes the position of the inclined plane 26 whereby one of the cam followers 41 and 42 is pushed upwardly against the bias of the spring washer 49, while the other cam follower is moved downwardly by the spring bias of the washer 49.

Accordingly, depending on the sense of rotation of the rotatable member 25, the mount proper is twisted relative to the horizontal plane 56 shown in FIG. 4 either in the direction of arrows 68 and 69 or in the direction of arrows 71 and 72. This, in turn, adjusts the azimuth of the air-gaps 14 relative to the axis 16 either in the direction of the arrows 73 and 74 or in the direction of the arrows 75 and 76 shown in FIG. 3. In this manner, the azimuth of the recording gaps 14 is adjusted efficiently and without undesired up-and-down motions. In accordance with preferred practice, the azimuth of the recording gaps 14 is initially adjusted so that the recording gaps are aligned on the axis 16 which extends perpendicularly to the direction of tape advance 21. This procedure most conveniently enables recordings to be made and played back on different tape recording machines.

In high-precision tape recording and playback machines, the surface 26 of the rotatable device 25 is typically much less inclined than as shown in FIG. 5. The required angle of rotation of the rotatable device 25 for a desired azimuth adjustment increases as the steepness of the inclined surface 26 relative to a horizontal plane decreases.

As a major advantage of the construction according to the illustrated preferred embodiment, different adjustment sensitivities (in terms of azimuth adjustment relative to angular movement of the key 58) can readily be realized by changing the angle of inclination of the inclined surface 26. In practice, different rotatable members 25 with differently inclined surfaces 26 may be provided to permit realization of different adjustment sensitivities, depending on the requirements of the application.

Considering the adjustability of the mount 37 as shown in FIG. 4, it will be realized that the methods and apparatus of the subject invention can also be employed as leveling devices in instruments in which a device is to be adjusted relative to the horizontal plane 56. Various other applications will be apparent to the skilled equipment or instrument designer.

The scope of the subject invention is, of course, not limited to the illustrated embodiment but extends, for instance, to other azimuth adjusting apparatus in which a mount for an information transducing device is torsionally twisted relative to a torsion axis (e.g., an axis extending along the plane 48, FIG. 1, and longitudinally along the mount 37) while the mount is retained against translatory motion relative to that torsion axis ("Translatory motion" as herein employed refers to movement in the same direction of all points of the mount along a cross-section thereof).

In accordance with a preferred embodiment of the invention, the mount may be twisted and retained against translatory motion by means for selectively subjecting the mount to rotary motion relative to, and to one side of, the torsion axis, and by means for subjecting the mount to an opposite rotary motion relative to, and to an opposite side of, the torsion axis. By way of example and not by way of limitation, the latter two means in the illustrated embodiment include the cam followers 41 and 42 in conjunction with the rotary device 25 having the inclined surface 26. The mount may then preferably have a recessed portion 55 for facilitating the defined rotary motions.

Further variations or modifications within the spirit and scope of the invention will become apparent to or suggest themselves to those skilled in the art.

1. A method of mounting a device and adjusting the azimuth of said device in a first plane, comprising in combination the steps of:

providing a rotatable member having an inclined surface relative to an axis extending substantially parallel to said first plane;

mounting said rotatable member for rotation relative to said axis;

providing a mount for said device having a resilient portion;

establishing a force-transmitting relationship between said inclined surface and said mount at a first location, and establishing a force-transmitting relationship between said inclined surface and said mount at a second location, said first and second locations being situated at opposite sides of said axis and extending in a second plane which extends at an angle to a third plane extending perpendicular to said first plane;

mounting said device on said mount at said first plane; and twisting said mount at said resilient portion by rotating said rotatable member relative to said axis to adjust the azimuth of said device.

2. A method as claimed in claim 1, wherein:

said second plane is made to extend parallel to said first plane.

3. A method as claimed in claim 2, including in said combination the steps of:

providing a support for said mount; and mounting said mount on said support at a third location situated behind said first plane as seen from said axis.

4. A method as claimed in claim 3, wherein:

said mount is provided with said resilient portion between said first plane and said third location.

5. A method as claimed in claim 1, including in said combination the step of:

providing said device with magnetic recording heads having airgaps at said first plane.

6. Apparatus for mounting a device and adjusting the azimuth of said device in a first plane, comprising in combination:

supporting means;

a rotatable member having an inclined surface relative to an axis extending substantially parallel to said first plane;

a mount for said device;

means for mounting said rotatable member for rotation relative to said axis;

means at said mount and said rotatable member for establishing a force-transmitting relationship between said inclined surface and said mount at two spaced locations having said axis situated therebetween and extending in a second plane which extends at an angle to a third plane extending perpendicular to said first plane;

means for connecting said mount to said support means at a third location situated behind said first plane as seen from said axis;

means for mounting said device on said mount at said first plane said mount having a resilient portion between said first plane and said third location; and means for rotating said rotatable member relative to said axis to adjust the azimuth of said device.

7. Apparatus as claimed in claim 6, wherein: said second plane extends parallel to said first plane.

8. Apparatus as claimed in claim 6, wherein: said mount has a reduced cross-section at said resilient portion between said first plane and said third location.

9. Apparatus as claimed in claim 6, wherein: said device includes magnetic recording heads having airgaps at said first plane.

10. Apparatus as claimed in claim 6, wherein: said means for establishing said force-transmitting relationship include a pair of spaced cam followers projecting from said mount onto said inclined surface of said rotatable member, said cam followers having said axis situated therebetween and extending in said second plane.

11. Apparatus as claimed in claim 10, wherein: said second plane extends parallel to said first plane.

12. Apparatus as claimed in claim 10, wherein: said cam followers are integral with said mount.

13. Apparatus as claimed in claim 10, wherein: said means for establishing said force-transmitting relationship further include resilient means for yieldably pressing said cam followers into contact with said inclined surface.

14. Apparatus as claimed in claim 10, wherein: said means for rotating said rotatable member include a drive member for said rotatable member and means for placing said drive member into force-transmitting engagement with said rotatable member.

15. Apparatus as claimed in claim 14, wherein: said drive member includes a second rotatable member and means for rotating said second rotatable member.

16. Apparatus as claimed in claim 15, wherein: said rotatable member has a toothed periphery; and said means for rotating said rotatable member include a gear wheel meshing with said toothed periphery and means for rotating said gear wheel.

17. Apparatus for mounting an information transducing device and adjusting the azimuth of said device relative to an information recording medium, comprising in combination:

a base;

a mount of said transducing device having a resilient portion;

means for connecting said mount to said base to one side of said resilient portion;

means for mounting said transducing device on said mount to another side of said resilient portion;

means coupled to said mount for selectively and torsionally twisting said resilient portion of said mount relative to a torsion axis whereby to adjust the azimuth of said transducing device; and means coupled to said mount for retaining said mount against translatory motion relative to said torsion axis.

18. Apparatus as claimed in claim 17, wherein: said means for selectively twisting said resilient portion of said mount and said means for retaining said mount against translatory motion jointly include means for selectively subjecting said mount to rotary motion relative to, and to one side of, said torsion axis, and means for subjecting said mount to an opposite rotary motion relative to, and to an opposite side of, said torsion axis.

19. Apparatus as claimed in claim 18, wherein: said means for retaining said mount against translatory motion include a support for said mount and means for attaching an end portion of said mount to said support.

20. Apparatus as claimed in claim 19, wherein: said mount has a recessed portion for facilitating said rotary motions.

* * * * *

PO-1050
(5/69)

UNITED STATES PATENT OFFICE
CERTIFICATE OF CORRECTION

Patent No. 3,794,769 Dated February 26, 1974

Inventor(s) Joseph J. Neff

It is certified that error appears in the above-identified patent and that said Letters Patent are hereby corrected as shown below:

Column 2, line 32, --reduced cross-section at said-- should be inserted after "a". Column 2, line 34, cancel "reduced cross-section at said". Column 2, line 53, cancel "a". Column 2, line 54, cancel "base" and insert --a base,-- after the comma. Column 2, line 59, cancel "the" and insert --the-- after "of".

Signed and sealed this 1st day of October 1974.

(SEAL)
Attest:

McCOY M. GIBSON JR.
Attesting Officer

C. MARSHALL DANN
Commissioner of Patents